United States Patent
Park et al.

(10) Patent No.: US 9,367,056 B2
(45) Date of Patent: Jun. 14, 2016

(54) TEST-OPERATION CONTROL APPARATUS, SYSTEM, AND METHOD

(75) Inventors: Hanwon Park, Seoul (KR); Sangchul Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 529 days.

(21) Appl. No.: 13/017,808

(22) Filed: Jan. 31, 2011

(65) Prior Publication Data

US 2011/0191634 A1    Aug. 4, 2011

(30) Foreign Application Priority Data

Feb. 4, 2010    (KR) .................. 10-2010-0010638

(51) Int. Cl.
*G06F 11/263*    (2006.01)
*G05B 15/02*    (2006.01)

(52) U.S. Cl.
CPC ........ *G05B 15/02* (2013.01); *G05B 2219/2642* (2013.01)

(58) Field of Classification Search
CPC .... G05B 19/04; G05B 23/0256; G05B 15/00; G05B 15/02; G05B 2219/2638; G05B 2219/2642; G05B 19/00; G05B 19/045; G06F 11/263
USPC ......................................................... 702/119
See application file for complete search history.

(56) References Cited

U.S. PATENT DOCUMENTS

| | | | |
|---|---|---|---|
| 3,594,752 A * | 7/1971 | Alton ............................ | 340/585 |
| 4,543,637 A * | 9/1985 | Smith et al. .................. | 700/269 |
| 6,778,934 B1 | 8/2004 | Hori et al. | |
| 8,781,633 B2 * | 7/2014 | Fata et al. .................... | 700/276 |
| 2004/0006761 A1 | 1/2004 | Anand et al. | |
| 2004/0054492 A1 * | 3/2004 | Hagerott et al. ............. | 702/120 |
| 2007/0143451 A1 | 6/2007 | Huth et al. | |
| 2011/0054643 A1 * | 3/2011 | Law et al. ..................... | 700/79 |

FOREIGN PATENT DOCUMENTS

| | | |
|---|---|---|
| JP | 2002-130764 | 5/2002 |
| JP | 2007-032930 | 2/2007 |

OTHER PUBLICATIONS

Gado et al., Measurements of the Dynamic Performance and Behavior of Air-Conditioning Systems Using a Dynamic Test Facility, Jul. 12-15, 2004, International Refrigeration and Air Conditioning Conference at Purdue, 9 pp.*

* cited by examiner

*Primary Examiner* — Toan Le
(74) *Attorney, Agent, or Firm* — Dentons US LLP (57) ABSTRACT

A test-operation control apparatus, system and method are disclosed to reduce time and cost required for test operation by automatically performing test-operation on a control point of facilities installed on site based on a previously established template sequence and operational conditions of the situation on the spot. The test-operation control apparatus includes: a storage unit configured to store a basic sequence with respect to each of one or more control points set in the facilities installed on the spot (or site); an input unit configured to selectively receive one or more of the control points and receive operational conditions of each basic sequence with respect to each of the one or more of the selected control points; and a controller configured to combine the basic sequences with respect to each of the one or more of the selected control points according to the inputted operational conditions to generate a test-operation sequence.

17 Claims, 4 Drawing Sheets

TEST-OPERATION CONTROL APPARATUS, SYSTEM, AND METHOD

CROSS-REFERENCE TO A RELATED APPLICATION

Pursuant to 35 U.S.C. §119(a), this application claims the benefit of earlier filing date and right of priority to Korean Application No. 10-2010-0010638, filed on Feb. 4, 2010, the content of which is incorporated by reference herein in its entirety.

BACKGROUND OF THE INVENTION

1. Field of the Invention

The present invention relates to a test-operation control apparatus, a test-operation control system, and a test-operation control method and, more particularly, to an apparatus and system for controlling test-operation through control points set in equipment, and a method for controlling test-operation in the apparatus or system.

2. Description of the Related Art

In general, various facilities (or equipment) such as an air-conditioning and heating devices such as an air-conditioner or a ventilator, illumination, electricity, and the like, are installed in buildings. A building management system is constructed to manage such facilities at the center. After the building management system is installed, an initial test-operation must be performed.

A manager must directly test-operate the related art building management system. However, because various facilities are installed in the building and there are so many control points, the manager must repeat the process of testing the constituents of the building management system by directly manipulating them in order to test-operate the control points of the respective facilities. Also, an expert must be necessarily involved in making a check list required for performing test-operation, so the dependence on the expert's accumulated experience which is subjective is high, lacking the consistency in performing test-operation and having difficulty in processing in real time.

Thus, a method for reducing the time and cost required for the manager's repeated operation and dependence on the technical skills of the expert is required.

SUMMARY OF THE INVENTION

According to an aspect of the present invention, there is provided a test-operation control apparatus including: a storage unit configured to store a basic sequence with respect to each of one or more control points set in the facilities installed on the spot(or site); an input unit configured to selectively receive one or more of the control points and receive operational conditions of each basic sequence with respect to each of the one or more of the selected control points; and a controller configured to combine the basic sequences with respect to each of the one or more of the selected control points according to the inputted operational conditions to generate a test-operation sequence.

The test-operation control apparatus may further include: a communication unit configured to transmit the test-operation sequence to a direct digital controller (DDC) that controls one or more of the selected control points or a central control management system (CCMS) that controls the DDC.

The communication unit may receive a result value with respect to the operation of the one or more of the selected control points according to the test-operation sequence from the DDC or the CCMS.

The input unit may receive an expectation value with respect to the operation of one or more of the selected control points, and the controller may compare the expectation value and the result value to determine whether or not one or more of the control points operate normally.

The controller may generate a test-operation result report including information about whether or not one or more of the control points operate normally, and store the same in the storage unit.

The test-operation control apparatus may further include: an output unit configured to output the test-operation result report.

The input unit may receive the operational conditions within a pre-defined range.

According to another aspect of the present invention, there is provided a test-operation control method including: selectively receiving one or more of control points set in facilities installed on site; calling a basic sequence with respect to each of one or more of the selected control points; receiving operational conditions of each basic sequence with respect to each of one or more of the selected control points; and combining the basic sequences with respect to each of one or more of the selected control points according to the inputted operational conditions to generate a test-operation sequence.

The test-operation control method may further include: receiving a pre-defined command; and transmitting the test-operation sequence to a direct digital controller (DDC) that controls one or more of the selected control points or a central control management system (CCMS) that controls the DDC.

The test-operation control method may further include: receiving a result value with respect to operations of one or more of the selected control points according to the test-operation sequence from the DDC or the CCMS.

The test-operation control method may further include: receiving an expectation value with respect to the operations of one or more of the selected control points; and comparing the expectation value and the result value to determine whether or not the one or more of the selected control points operate normally.

The test-operation control method may further include: generating a test-operation result report including information about whether or not the one or more of the selected control points operate normally; and storing the generated test-operation result report.

According to another aspect of the present invention, there is provided a test-operation control system including: a direct digital controller (DDC) configured to control one or more of control points set in facilities installed on site; and a test-operation control apparatus configured to store a basic sequence with respect to the one or more of control points, selectively receive one or more of the control points, receive operational conditions of each basic sequence with respect to each of the one or more of the selected control points, combine the basic sequences with respect to each of the one or more of the selected control points according to the inputted operational conditions to generate a test-operation sequence, and transmit the test-operation sequence to the DDC.

When the DDC receives the test-operation sequence from a test-operation control apparatus, it may control the operations of the one or more of the selected control points according to the received sequence.

The test-operation control system may further include: a central control management system (CCMS) configured to control the DDC, wherein when the DDC receives the test-operation sequence from the test-operation control apparatus, it may transmit the test-operation sequence to the DDC.

The foregoing and other objects, features, aspects and advantages of the present invention will become more apparent from the following detailed description of the present invention when taken in conjunction with the accompanying drawings.

DETAILED DESCRIPTION OF THE INVENTION

A test-operation control apparatus, a test-operation control system, and a test-operation control method for automatically performing test-operation based on operational conditions fitting a basic sequence previously established in commissioning facilities in a building and on-site conditions according to exemplary embodiments of the present invention will now be described with reference to FIGS. 1 to 7.

Figure 1:
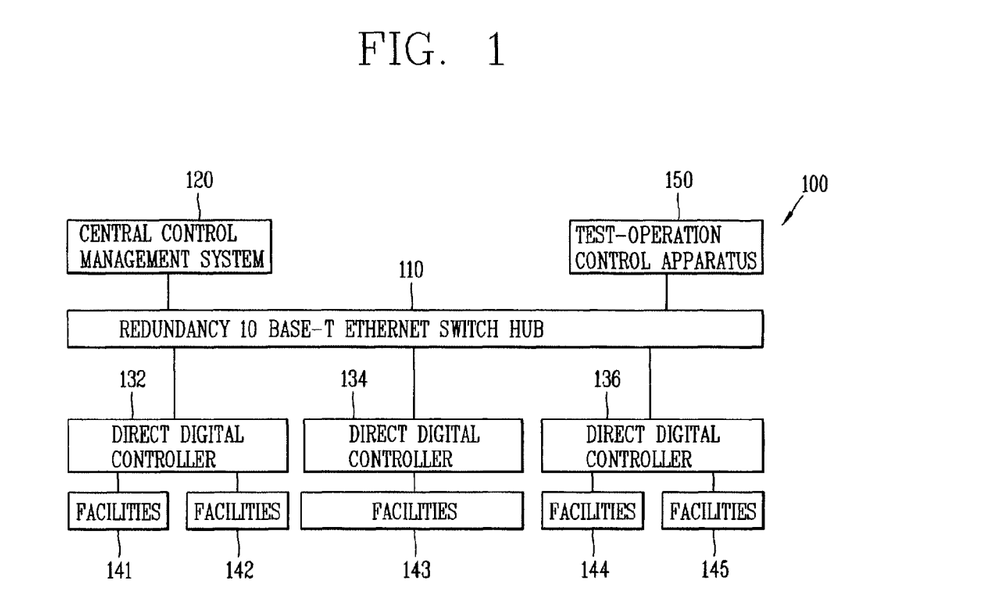
FIG. 1 illustrates a test-operation control system 100 according to an exemplary embodiment of the present invention.

FIG. 1 illustrates a test-operation control system 100 according to an exemplary embodiment of the present invention. The test-operation control system 100 according to an exemplary embodiment of the present invention includes a redundancy 10 base-T Ethernet switch hub 110, a central control management system 120, direct digital controllers 132, 134, and 136, facilities 141 and 145, and a test-operation control apparatus 150.

The redundancy 10 base-T Ethernet switch hub 110 is communication equipment connecting the central control management system 120, direct digital controllers 132, 134, and 136, and the test-operation control apparatus 150 to providing information sharing therebetween. Meanwhile, a reliable and fast communication infrastructure needs to be established between the constituents of the test-operation control system 100 in order to share more information required for controlling and monitoring between the constituents, and a BACnet (Building Automation & Control Network) has been adopted as an international standard of the communication method related to the building automation.

The central control management system 120 serves to collectively control and manage the overall situation of a building. The central control management system 120 includes an automation server for controlling and monitoring the direct digital controllers 132, 134, and 136, the facilities 141 to 145, and control points of the facilities 141 to 145. Also, the central control management system 120 may further include a terminal for managing a plant and machinery, illumination/power, entry controlling, disaster prevention, parking management, and facility management.

According to an exemplary embodiment of the present invention, when the central control management system 120 receives a test-operation sequence from the test-operation control apparatus 150, it transmits the received test-operation sequence to the direct digital controllers 132, 134, and 136. When the central control management system 120 receives a result value of the operation of a control point according to the test-operation sequence from the direct digital controllers 132, 134, and 136, it transmits the result value of the operation to the test-operation control apparatus 150.

The direct digital controllers 132, 134, and 136 are microcomputers for recording and storing information related to all the facilities such as a control output, a state change, and the like, of the facilities 141 and 145 through the control points set in the facilities 141 to 145, and applying a control operation signal to the facilities 141 to 145 through a softwarewise calculation process according to an installed control logic. The direct digital controllers 132, 134, and 136 are connected with the central control management system 120 via a gateway and/or a communication network and transmit and receive information to and from the central control management system 120. The direct digital controllers 132, 134, and 136 monitor and control each control point of the facilities 141 to 145 installed within the building and directly control input and output signals of the facilities 141 to 145 by using an installed function.

According to an exemplary embodiment, when a test-operation sequence is received from the central control management system 120 or from the test-operation control apparatus 150, the direct digital controllers 132, 134, and 136 control the operations of one or more of the control points set in the facilities 141 to 146 according to the test-operation sequence, and generates results values of the operations. Also, the direct digital controllers 132, 134, and 136 transmit the result values of the operations to the central control management system 120 or to the test-operation control apparatus 150.

The facilities 141 to 145 include various sensors for measuring temperature, humidity, pressure, wind velocity, fingerprint, fire, parking, power, and the like, various actuators such as a damper actuator, a valve actuator, and the like, and a damper, valve, etc. The facilities 141 to 145 include an air-conditioner, a ventilator, an air-conditioner, a fan, a cooling tower, a pump, a temperature/humidity sensor, a tank, a freezing device, a lighting system, a power device, a fire detector, and the like.

The test-operation control apparatus 150 generates a test-operation sequence by applying operational conditions inputted by the user to a pre-set basic sequence, and is connected with the central control management system 120 and/or the direct digital controllers 132, 134, and 136 to share various information including signals and data related to performing of the test-operation.

The test-operation control apparatus 150 stores a basic sequence in the form of a template library for basically testing the facilities 141 to 145 through the one or more of the control points set in the facilities 141 to 145. Also, the test-operation control apparatus 150 retrieves information regarding the one or more of the control points set in the facilities 141 to 145 installed on the site from an internal or external storage space and provide the information to the user.

The test-operation control apparatus 150 selectively receives one or more of the control points included in the information regarding one or more of the control points from the user. Also, the test-operation control apparatus 150 retrieves a basic sequence with respect to each of the one or more of the selected control points. Also, the test-operation control apparatus 150 extracts a basic operational condition with respect to each of the one or more of the selected control points from the basic sequences and provides the same to the user.

The test-operation control apparatus 150 receives test-operation conditions according to the situation on the site based on the basic operational condition from the user. Also, the test-operation control apparatus 150 applies the received test-operation conditions to the corresponding basic sequences and combines the test-operation conditions applied basic sequences to generate a test-operation sequence.

The test-operation control apparatus 150 may transmit the generated test-operation sequence to the central control management system 120. In this case, the central control management system 120 may transmit a sequence corresponding to each control point among the test-operation sequences, to the direct digital controllers 132, 134, and 136 that control the facilities 141 to 145 in which the one or more of the control points included in the test-operation sequences are set. Also, the test-operation control apparatus 150 may directly transmit a sequence corresponding to each control point, among the test-operation sequences, to the direct digital controllers 132, 134, and 136 that control the facilities 141 to 145 in which the one or more of the control points included in the test-operation sequences are set.

The test-operation control apparatus 150 may receive results values obtained by performing the operations of the one or more of the control points selected according to the test-operation sequence directly from the direct digital controllers 132, 134, and 136 or by way of the central control management system 120. Also, the test-operation control apparatus 150 may further receive an expectation value with respect to the performing of the operations of the one or more of the control points selected according to the test-operation sequence. Also, the test-operation control apparatus 150 may determine whether or not the one or more of the control points selected according to the test-operation sequence operate normally by comparing the received result values and the received expectation value.

The test-operation control apparatus 150 may generate a test-operation result report including whether or not one or more of the control points selected according to the test-operation sequence normally operate. Whether or not the one or more of the control points normally operate may include operational history including a test-operation performing time or the like with respect to each control point and a determination result indicating whether the operation is normal or abnormal. Also, the test-operation control apparatus 150 may store the generated test-operation result report in the storage space provided in the test-operation control apparatus 150 or provide the test-operation result report to the user.

Figure 2:
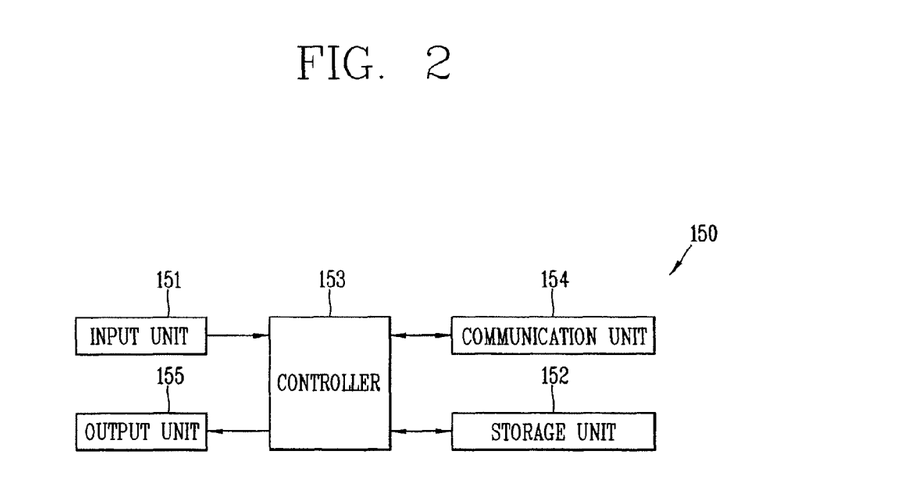
FIG. 2 is a detailed block diagram of a test-operation control apparatus 150 illustrated in FIG. 1.

FIG. 2 is a detailed block diagram of a test-operation control apparatus 150 illustrated in FIG. 1. The test-operation control apparatus 150 includes an input unit 151, a storage unit 152, a controller 153, a communication unit 154, and an output unit 155.

The input unit 151 receives an input command applied by the user to control the operation of the test-operation control apparatus 150, and transfers the received command to the controller 153, so that the controller 153 can operate according to the command. The input unit may be configured as a mouse, a key board, a keypad, a dome switch, a touch pad (e.g., static pressure/capacitance), a jog wheel, a jog switch, a microphone, and the like.

According to an exemplary embodiment of the present invention, the input unit, receives one or more selected control points to perform test-operation, among the one or more control points set in the facilities 141 to 145 installed on the site. Also, the input unit 151 receives test-operation conditions according to the situation on the site based on the basic operational conditions included in the basic sequence with respect to each of one or more selected control points. Also, the input unit 151 may further receive an expectation value with respect to performing the operations of the one or more selected control points according to a test-operation sequence. Also, the input unit 151 may receive a command for generating the test-operation sequence or a method for transmitting the test-operation sequence from the user.

Preferably, the input unit 151 may receive the operational conditions added to the test-operation sequence with respect to one or more control points set in the facilities 141 to 145 according to the situation on the site, within a pre-defined range. In this case, because an unexpected error may occur according to the situation on the spot if the operational conditions exceed the performance of the facilities 141 to 145 or due to an application of an erroneous operational condition, preferably, the operational conditions are received within a pre-defined range so that an error may not be generated within the performance of the facilities 141 to 145.

Also, preferably, the input unit may receive a required input from the user according to a provided interface type in the graphic user interface (GUI) or a text interface environment. For example, when the test-operation sequence is generated or transmitted, the test-operation sequence is generated or transmitted based on selection of a particular button in the GUI environment or input of a particular command in the text interface environment.

The storage unit 152 includes a ROM (Read Only Memory), for example, a flash memory, for storing a program for an operation of the controller 153, and a RAM (Random Access Memory) for storing data temporarily outputted and processed for transmission or reception or display.

According to an exemplary embodiment of the present invention, the storage unit 152 stores a basic sequence in a template library format for basically testing the facilities 141 to 145 through one or more control points set in the facilities 141 to 145. The basic sequence is managed as excel or in the form of a file such as defined text or the like. Operational conditions of the facilities 141 to 145 are added to the basic sequence according to the situation on the spot so as to be used as the original of the test-operation sequence provided to a logic of an actual test-operation. The basic sequence is previously established before generation of the test-operation sequence. Meanwhile, according to implementation examples, the basic sequence may be stored in an external storage space of the test-operation control apparatus 150 and may be transmitted to the test-operation control apparatus 150 via an interface (a USB, a network, etc.) from the external storage space.

Meanwhile, the basic sequence includes a function controlling the operations of the facilities 141 to 145 through the control points set in the facilities 141 to 145 and parameters, including operational conditions, of the function. Preferably, priority may be set to define the execution order of each of the basic sequences corresponding to each control point. Also, preferably, dependency with respect to each of the basic sequences corresponding to each control point may be defined, and controlling of an operation with respect to one control point based on dependency may be dependent upon controlling of an operation with respect to another control point.

The storage unit 152 may further store information regarding one or more control points set in the facilities 141 to 145 installed on site. Also, the storage unit 152 may store a test-operation result report generated by the controller 153.

The controller 153 controls a general operation of the test-operation control device 150. For example, the controller 153 may perform controlling and processing for generation of a test-operation sequence or creation of a result report.

According to an exemplary embodiment, the controller 153 calls information regarding one or more control points set in the facilities 141 to 145 installed on site from the storage unit 152 or an external storage space. Also, when one or more control points are selected by the user, the controller calls a basic sequence with respect to each of the one or more selected control points from the storage unit 152. Also, the controller 153 extracts a basic operational condition with respect to each of the one or more control points selected by the user from the basic sequence.

The controller 153 applies the test-operation conditions inputted by the user to the basic sequence with respect to each of the one or more control points selected by the user and combines the basic sequences to which the inputted test-operation conditions have been applied, to generate a test-operation sequence. Preferably, the controller 153 may generate the test-operation sequence in consideration of priority or dependency of the basic sequence.

The controller 153 may determine whether or not one or more control points selected according to the test-operation sequence operate normally by comparing the result value of the operation received from the direct digital controllers 132, 134, and 136 or the central control management system 120 and the expectation value received from the user. Also, the controller 153 may generate a test-operation result report including whether or not the one or more control points selected according to the test-operation sequence operate normally. Whether or not the one or more control points operate normally may include operation history including a test-operation performing time with respect to each control point and a determination result indicating whether the operation is normal or abnormal.

Also, preferably, the controller 153 may provide a graphic user interface (GUI) or a text interface.

The communication unit 154 performs modulation or demodulation and coding or decoding operation on signals transmitted to or received from the central control management system 120 and the direct digital controllers 132, 134, and 136 by the test-operation control apparatus 150.

According to an exemplary embodiment, the communication unit 154 may transmit a test-operation sequence generated by the controller 153 to the central control management system 120. In this case, the central control management system may transmit a sequence corresponding to each control point among test-operation sequences to the direct digital controllers 132, 134, and 136 that control the one or more facilities 141 to 145 for which the control points included in the test-operation sequence have been set. Also, the communication unit 154 may directly transmit a sequence corresponding to each control point among the test-operation sequences to the direct digital controllers 132, 134, and 136 that control the one or more facilities 141 to 145 for which the control points included in the test-operation sequence have been set.

Meanwhile, upon receiving the corresponding sequence among the test-operation sequences, the direct digital controllers 132, 134, and 136 may control the one or more control points set for the facilities 141 to 145 according to the corresponding sequence. Accordingly, each of the corresponding facilities 141 to 145 performs an operation on the one or more selected control points according to a determined order (e.g., priority) or a certain logic (e.g., dependency) based on the test-operation sequence.

Preferably, the communication unit 154 may receive a result value with respect to the operation performed on the one or more selected control points according to the test-operation sequence directly from the direct digital controllers 132, 134, and 136 or by way of the central control management system 120.

The output unit 155 serves to output an audio signal or a video signal. The output unit 155 may include a display unit (not shown) for displaying and outputting information which has been processed by the test-operation control apparatus 150, an audio output module (not shown) for outputting audio data which has been received from the communication unit 154 or stored in the storage unit 152, and the like. The display unit (not shown) displays a UI (User Interface) or a GUI (Graphic User Interface) related to test-operation controlling. The audio output module (not shown) outputs an audio signal related to the function performed by the test-operation control apparatus 150. The audio output module (not shown) may include a speaker, a buzzer, and the like.

According to an exemplary embodiment of the present invention, the output unit 155 provides information regarding one or more control points set in the facilities 141 to 145 installed on site to the user. Also, the output unit 155 provides basic operational conditions for each of one or more control points selected by the user to the user. Also, the output unit 155 may provide a test-operation result report generated by the controller 153 to the user.

Figure 3:
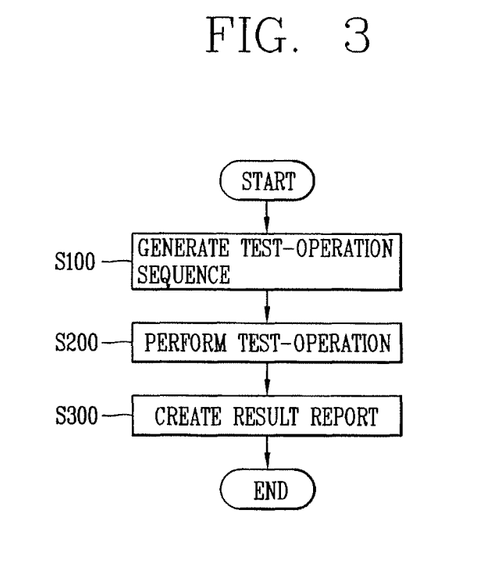
FIG. 3 is a flow chart illustrating the process of controlling test-operation according to an exemplary embodiment of the present invention.

FIG. 3 is a flow chart illustrating the process of controlling test-operation according to an exemplary embodiment of the present invention. First, the test-operation control apparatus 150 generates a test-operation sequence according to a basic sequence with respect to each of one or more control points selected by the user from among the one or more control points set in the facilities installed on site and the operational conditions of the basic sequences inputted by the user (S100).

When a pre-defined command is received, the test-operation control apparatus 150 transmits the generated test-operation sequence to the direct digital controllers 132, 134, and 136 that control the one or more control points selected by the user or to the central control management system 120 that control the direct digital controllers 132, 134, and 136. Also, the test-operation control apparatus 150 receives a result value with respect to the one or more control points selected by the user according to the test-operation sequence from the direct digital controllers 132, 134, and 136 or from the central control management system 120 (S200).

The test-operation control apparatus 150 receives an expectation value with respect to the operations of the one or more control points selected by the user according to the test-operation sequence, and compares the expectation value and the result value to determine whether or not the one or more control points selected by the user operate normally. Also, the test-operation control apparatus 150 generates a test-operation result report including information as to whether or not the one or more control points selected by the user operate normally, and stores the generated test-operation result report (S300).

Figure 4:
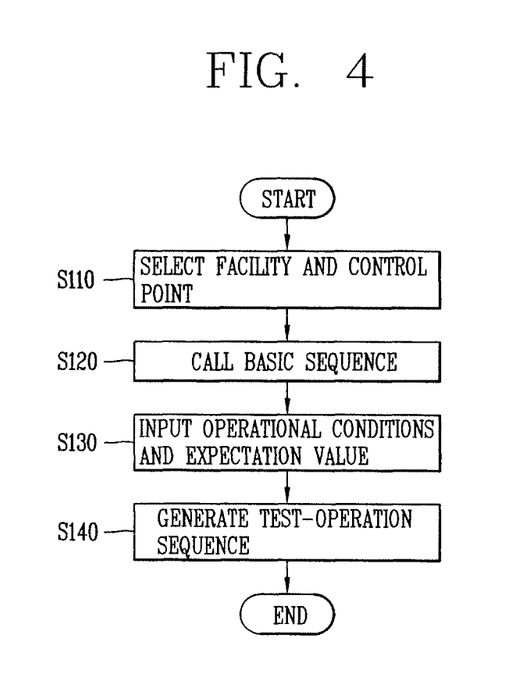
FIG. 4 is a detailed flow chart illustrating the process (S100) of generating a test-operation sequence illustrated in FIG. 3.

FIG. 4 is a detailed flow chart illustrating the process (S100) of generating a test-operation sequence illustrated in FIG. 3. First, the controller calls information regarding one or more control points set in the facilities 141 to 145 installed on site from the storage unit 152 or the external storage space. Also, the output unit 155 provides the information regarding the one or more control points called by the controller 153 to the user. Also, the input unit 151 selectively receives one or more control points to perform a test-operation from among the one or more control points included in the provided information regarding the control points (S110).

When the one or more control points are selected in step S110, the controller 153 calls a basic sequence with respect to each of one or more of the selected control point from the storage unit 152. Also, the controller 153 extracts basic operational conditions from the called basic sequence. Also, the output unit 155 provides the basic operational conditions extracted by the controller to the user (S120).

The input unit 151 receives the test-operation conditions according to the situation on the spot based on the basic operational conditions from the user. Preferably, the input unit 151 may further receive an expectation value with respect to the operations of the one or more selected control points according to the test-operation sequence (S130).

The controller 153 applies the inputted test-operation conditions to the basic sequence with respect to each of the one or more selected control points and combines the basic sequences to which the inputted operational conditions have been applied, to generate a test-operation sequence (S140).

Figure 5:
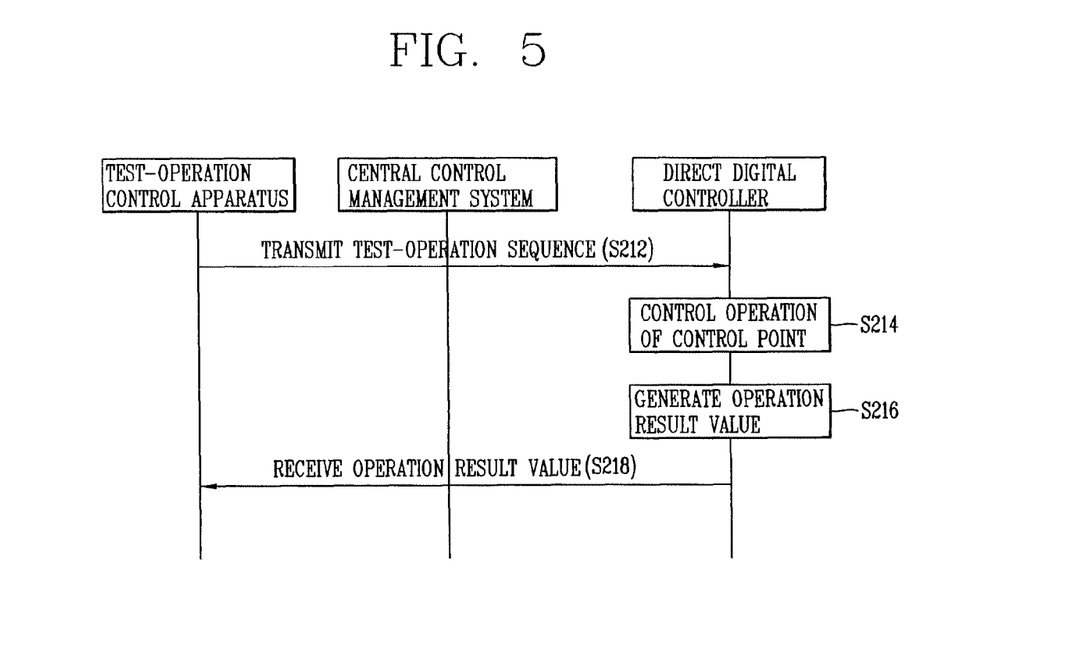
FIG. 5 is a detailed flow chart illustrating the process (S200) of performing test-operation illustrated in FIG. 3.

FIG. 5 is a detailed flow chart illustrating the process (S200) of performing test-operation illustrated in FIG. 3. The communication unit 154 may transmit the test-operation sequence generated by the controller 153 to the central control management system 120. In this case, the central control management system 120 may transmit the sequence corresponding to each control point among the test-operation sequences to the direct digital controllers 132, 134, and 136 that control the facilities 141 to 145 in which the control points included in the test-operation sequence have been set (S212). Upon receiving the corresponding sequence among the test-operation sequences, the direct digital controllers 132, 134, and 136 may control the control points set in the facilities 141 to 145 according to the corresponding sequence. Accordingly, each of the facilities 141 to 145 performs operation on the selected control points according to a determined order (e.g., priority) or a certain logic (e.g., dependency) based on the test-operation sequence (S214). Also, the direct digital controllers 132, 134, and 136 generate the result value of the operation which has been performed (S216). The direct digital controllers 132, 134, and 136 transmit the generated operation performing result value to the central control management system 120, and the communication unit 154 receives the operation performing result value of the one or more control points selected according to the test-operation sequence (S218).

Figure 6:
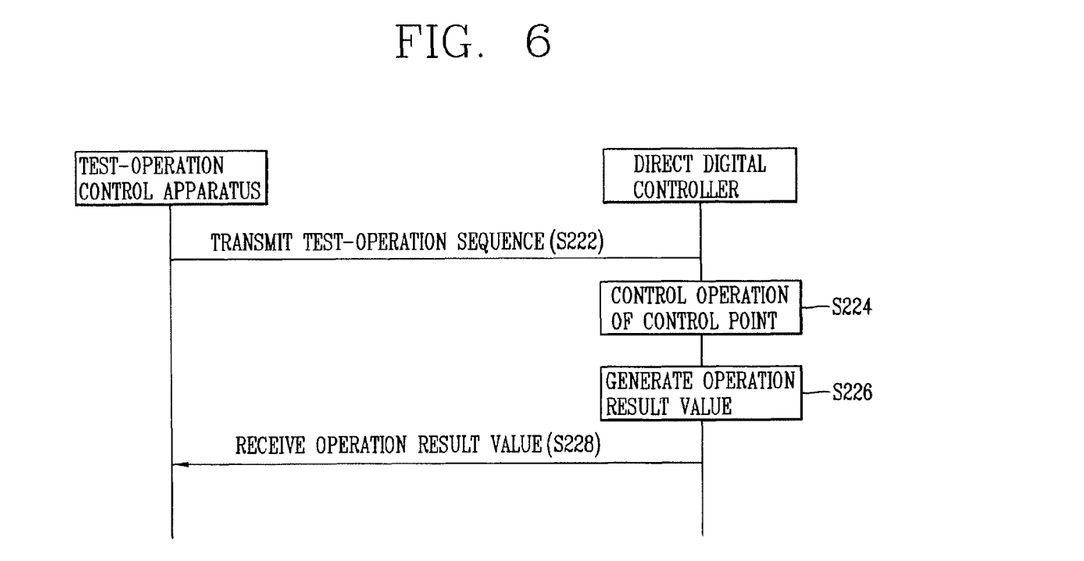
FIG. 6 is a detailed flow chart illustrating the process (S200) of performing test-operation illustrated in FIG. 3.

FIG. 6 is a detailed flow chart illustrating the process (S200) of performing test-operation illustrated in FIG. 3. The communication unit 154 may transmit the sequence corresponding to each control point among the test-operation sequences to the direct digital controllers 132, 134, and 136 that control the facilities 141 to 145 in which the control points included in the test-operation sequence have been set (S222). Upon receiving the corresponding sequence among the test-operation sequences, the direct digital controllers 132, 134, and 136 may control the control points set in the facilities 141 to 145 according to the corresponding sequence. Accordingly, each of the facilities 141 to 145 performs operation on the selected control points according to a determined order (e.g., priority) or a certain logic (e.g., dependency) based on the test-operation sequence (S224). Also, the direct digital controllers 132, 134, and 136 generate the result value of the operation which has been performed (S226). The communication unit 154 receives the operation performing result value from the direct digital controllers 132, 134, and 136 (S228).

Figure 7:
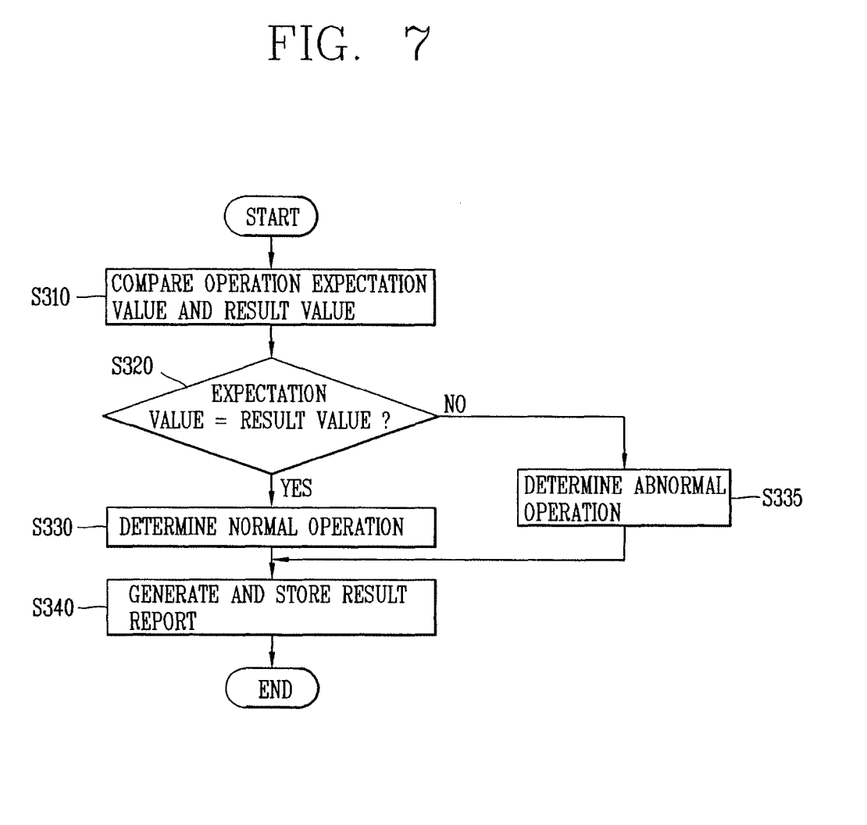
FIG. 7 is a detailed flow chart illustrating the process (S300) of creating a result report illustrated in FIG. 3.

FIG. 7 is a detailed flow chart illustrating the process (S300) of creating a result report illustrated in FIG. 3. The controller 153 compares the result value of the performed operation received by the communication unit 154 and the expectation value of the operation performing inputted to the input unit 151 (S310). Also, the controller 153 determines whether or not the result value and the expectation value are consistent within a certain range (e.g., within a tolerance) (S320). When the result value and the expectation value are consistent within the certain range in step S320, the controller 153 determines that the one or more selected control points operate normally (S330). Meanwhile, when the result value and the expectation value are not consistent within the certain range in step S320, the controller 153 determines that the one or more control points selected according to the test-operation sequence operate abnormally (S335).

Also, the controller 150 may generate a test-operation result report including information as to whether or not the one or more control points selected according to the test-operation sequence operate normally. Whether or not the one or more control points operate normally may include operation history including a test-operation performing time with respect to each control point and a determination result indicating whether the operation is normal or abnormal. The storage unit 152 may store the generated test-operation result report, and the output unit 155 may provide the generated test-operation result report to the user (S340).

According to the exemplary embodiments of the present invention, a repeated operation of the user required for a test-operation can be reduced and the test-operation performing is automated, thus reducing time and cost required for the test-operation. Also, because the test-operation result is automatically stored, feedback according to the test-operation result can be facilitated. In addition, the test-operation can be reliably performed by reducing a technical dependency on a skilled expert.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A test-operation control apparatus comprising:
a storage unit configured to store one or more basic sequences with respect to one or more control points set in one or more facilities;
an input unit to receive one or more inputs representing a plurality of selected control points responding to a plurality of selected facilities and to receive one or more operational conditions of the one or more basic sequences for the selected control points; and
a test-operation controller to apply the received one or more operational conditions to the one or more basic sequences, to combine the one or more basic sequences to which the received one or more operational conditions have been applied to generate a test-operation sequence according to dependency with respect to each of the one or more basic sequences corresponding to the selected control points,
wherein each of the selected facilities performs an operation on the selected control points according to a certain logic based on the test-operation sequence, wherein the certain logic is dependency between one of the selected control points and the other of the selected control points such that controlling an operation on the one of the selected control points depends on controlling an operation on the other of the selected control points, wherein the basic sequences are in a template library format for testing the facilities, wherein the test-operation controller includes a communication unit configured to transmit the test-operation sequence to a direct digital controller (DDC) that controls one or more of the selected control points or a central control management system (CCMS) that controls the DDC.

2. The test-operation control apparatus of claim 1, wherein the communication unit to forward the test-operation sequence to one or more control point controllers that control the selected control points or a management system that controls the one or more control point controllers.

3. The test-operation control apparatus of claim 2, wherein the communication unit receives a result value with respect to the operation of the selected control points according to the test-operation sequence from the one or more control point controllers or the management system.

4. The test-operation control apparatus of claim 3, wherein the input unit receives an expectation value with respect to the operation of the selected control points, and the test-operation controller compares the expectation value and the result value to determine whether or not the selected control points are operating normally.

5. The test-operation control apparatus of claim 4, wherein the test-operation controller generates a test-operation result report including information about whether or not the selected control points are operating normally, and stores the same in the storage unit.

6. The test-operation control apparatus of claim 5, further comprising:
an output unit to output the test-operation result report.

7. The apparatus of claim 1, wherein priority is set to define an execution order of the selected control points.

8. A test-operation control method comprising:
receiving, by an input unit of a test-operation control apparatus, a plurality of selected control points set in a plurality of selected facilities;
calling, by a test-operation controller of a test-operation control apparatus, one or more basic sequences with respect to the selected control points;
receiving, by the input unit, one or more operational conditions of the one or more basic sequences with respect to the selected control points;
applying the received one or more operational conditions to the one or more basic sequences;
combining, by the test-operation controller, the one or more basic sequences to which the received one or more operational conditions have been applied to generate a test-operation sequence according to dependency with respect to each of the one or more basic sequences corresponding to the selected control points;
transmitting the test-operation sequence to a direct digital controller (DDC) that controls one or more of the selected control points or a central control management system (CCMS) that controls the DDC; and
performing, by the selected facilities, an operation on the selected control points according to a certain logic based on the test-operation sequence, wherein the certain logic is dependency between one of the selected control points and the other of the selected control points such that controlling an operation on the one of the selected control points depends on controlling an operation on the other of the selected control points.

9. The test-operation control method of claim 8, further comprising:
receiving, by the input unit, a command; and
forwarding, by a communication unit of the test-operation control apparatus, the test-operation sequence to one or more control point controllers that control the selected control points or a management system that controls the one or more control point controllers.

10. The test-operation control method of claim 9, further comprising:
receiving, by the input unit, a result value with respect to operations of the selected control points according to the test-operation sequence from the one or more control point controllers or the management system.

11. The test-operation control method of claim 10, further comprising:
receiving, by the input unit, an expectation value with respect to the operations of the selected control points; and
comparing, by the test-operation controller, the expectation value and the result value to determine whether or not the selected control points are operating normally.

12. The test-operation control method of claim 11, further comprising:
generating, by the test-operation controller, a test-operation result report including information about whether or not the selected control points are operating normally; and
storing, by a storage unit of the test-operation control apparatus, the generated test-operation result report.

13. The method of claim 8, wherein priority is set to define an execution order of the selected control points.

14. A test-operation control system comprising:
one or more control point controllers to control one or more of control points set in one or more facilities; and
a test-operation control apparatus to store one or more basic sequences with respect to the one or more of control points, receive a plurality of selected control points responding to a plurality of selected facilities, receive one or more operational conditions of the one or more basic sequences with respect to the selected control points, apply the received one or more operational conditions to the one or more basic sequences, combine the one or more basic sequences to which the received one or more operational conditions have been applied to generate a test-operation sequence according to dependency with respect to each of the one or more basic sequences corresponding to the selected control points, and forward the test-operation sequence to the one or more control point controllers,
wherein the selected facilities performs an operation on the selected control points according to a certain logic based on the test-operation sequence, wherein the certain logic is dependency between one of the selected control points and the other of the selected control points such that controlling an operation on the one of the selected control points depends on controlling an operation on the other of the selected control points,
wherein the basic sequences are in a template library format for testing the facilities,
wherein the test-operation control apparatus includes a communication unit configured to transmit the test-operation sequence to a direct digital controller (DDC) that controls one or more of the selected control points or a central control management system (CCMS) that controls the DDC.

15. The test-operation control system of claim 14, wherein when the one or more control point controllers receive the test-operation sequence from the test-operation control apparatus, the one or more control point controllers control the operations of the selected control points according to the received test-operation sequence.

16. The test-operation control system of claim 14, further comprising:
   a management system to control the one or more control point controllers,
   wherein when the management system receives the test-operation sequence from the test-operation control apparatus, the management system forwards the test-operation sequence to the one or more control point controllers.

17. The system of claim 14, wherein priority is set to define an execution order of the selected control points.

* * * * *